United States Patent
Glassberg

[15] 3,704,037
[45] Nov. 28, 1972

[54] ARTICULATED DOOR PROTECTOR

[72] Inventor: Bernard Glassberg, 1948 Leonard Lane, Merrick, N.Y. 11566

[22] Filed: Dec. 14, 1970

[21] Appl. No.: 97,623

[52] U.S. Cl. .....................293/1, 16/86 R, 16/86 B, 40/129 C, 40/330, 108/46, 248/216, 248/317, 248/345.1, 293/62, 296/152
[51] Int. Cl. .......B60j 11/00, B60r 19/00, B61f 19/00
[58] Field of Search......16/86 R, 86 A, 86 B; 40/2 A, 40/129 C, 330; 52/716; 108/46; 114/219; 180/82; 224/42.45 R, 42.46 R; 248/216, 226, 317, 345.1; 280/150 B, 152; 293/1, 62; 296/152

[56] References Cited

UNITED STATES PATENTS

| | | | |
|---|---|---|---|
| 3,610,684 | 10/1971 | Richter | 293/1 X |
| 2,212,493 | 8/1940 | Brunken | 293/62 X |
| 2,606,755 | 8/1952 | Samuels | 248/345.1 X |
| 2,949,334 | 8/1960 | Amerpohl | 108/46 |
| 1,718,236 | 6/1929 | James | 40/2 A |
| 2,062,919 | 12/1936 | Maas | 114/219 |
| 1,214,957 | 2/1917 | Rosenfield et al. | 40/2 A |
| 1,468,672 | 9/1923 | Patten et al. | 40/129 C |
| 2,533,147 | 12/1950 | Sparks | 248/226 |
| 2,675,983 | 4/1954 | King | 248/226 |
| 2,704,224 | 3/1955 | Banks | 108/46 X |
| 2,734,765 | 2/1956 | Henderson et al. | 293/62 |

*Primary Examiner*—Gerald M. Forlenza
*Assistant Examiner*—Howard Beltran
*Attorney*—Polachek, Saulsbury & Hough

[57] ABSTRACT

A car door protector has been improvised which is formed of parts that can be rolled together or can be collapsed into a compact package adapted for storage when not in use and which can be attached to the keyhole of the car door and suspended from a string that has an enlargement or tongue on the lower end of which that can that can be inserted through a hole in the uppermost slot or portion of the protection member. This attaching member is effective as a hook for the suspension of the protection member. Another form of hook which is detachably connected to the suspension member and adapted to be fitted between the glass and the frame of the door and which has a depending string and T-shaped tongue. The hook can also be an integral part of the upper slat member and folded therewith into the collapsed slat package. The protective member as provided by opposite plastic sheets having a foam rubber filler disposed therebetween and this combination cut alternately to provide hinge joints of the opposite layers to permit the collapse of the slots in an accordian like manner. A protection member can be made of a series of elongated tubes held together by knotted strings and suspended from a hook connected to the uppermost tube. In another form heat sealed plastic sheets containing ribbed or longitudinally extending pockets of foam rubber particles. A key shaped hook integral with a string which in turn is integral with a plastic sheet made from a single stamping and to which a foam rubber sheet can be adhered is provided.

12 Claims, 22 Drawing Figures

PATENTED NOV 28 1972
3,704,037
SHEET 1 OF 3
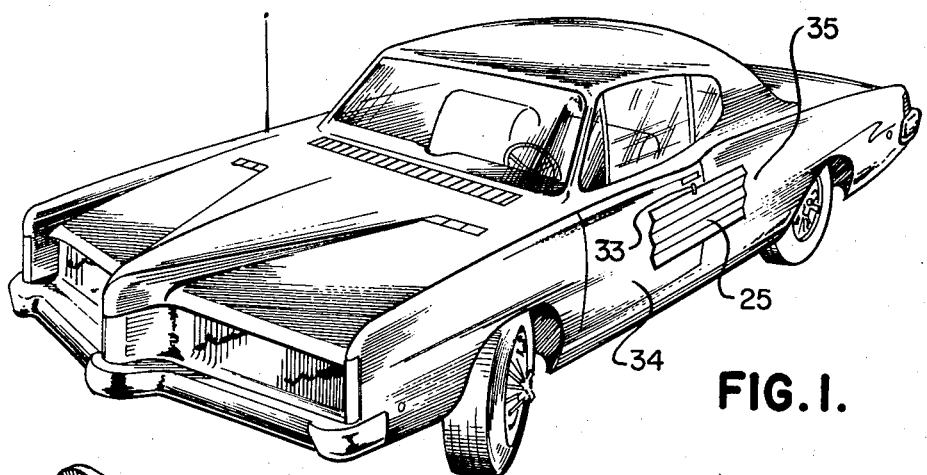
FIG. 1.
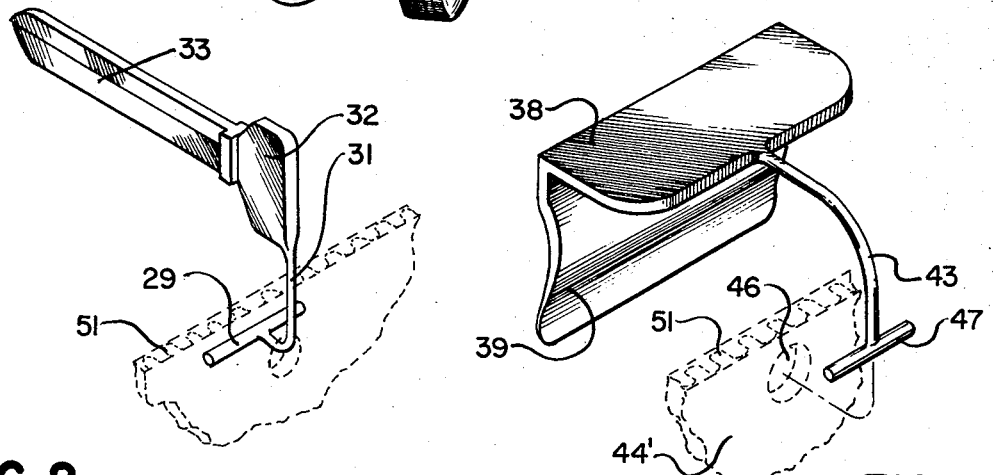
FIG. 2.
FIG. 4.
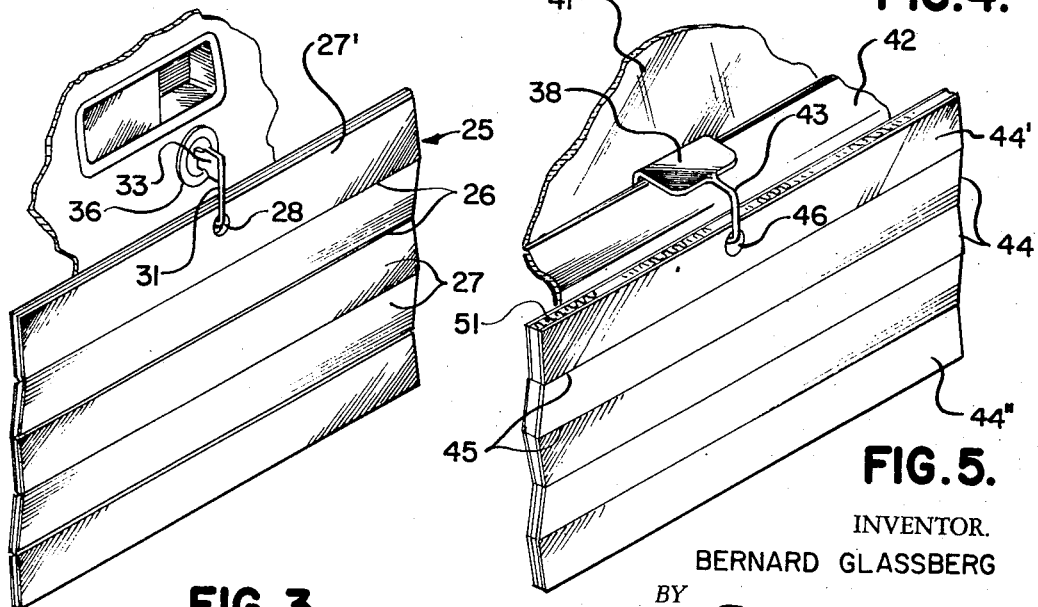
FIG. 3.
FIG. 5.
INVENTOR.
BERNARD GLASSBERG
BY *Polachek & Saulsbury*
ATTORNEYS

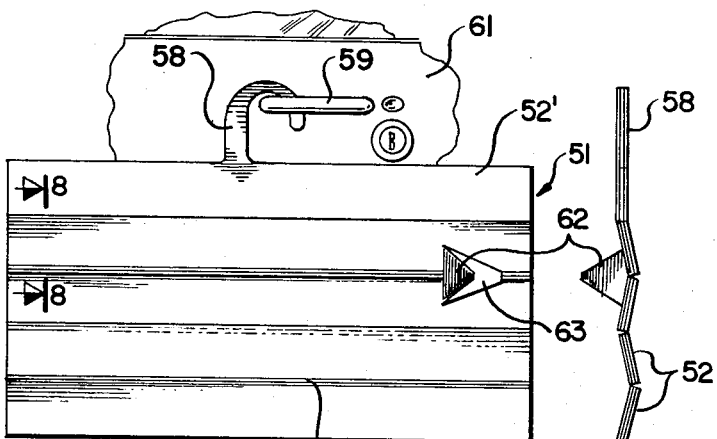
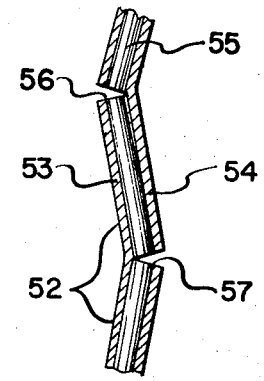
FIG. 6.   FIG. 7.   FIG. 8.
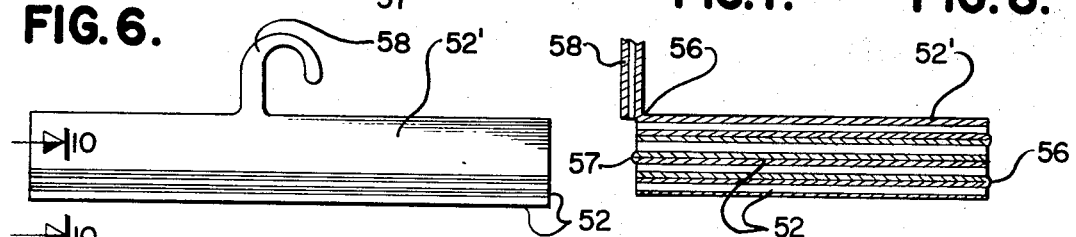
FIG. 9.   FIG. 10.
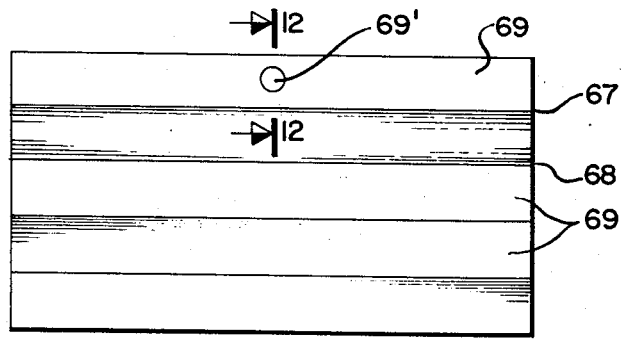
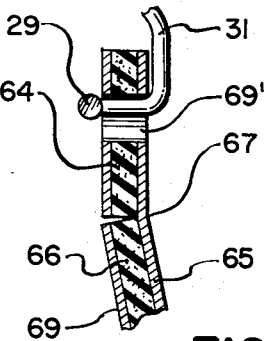
FIG. 11.   FIG. 12.
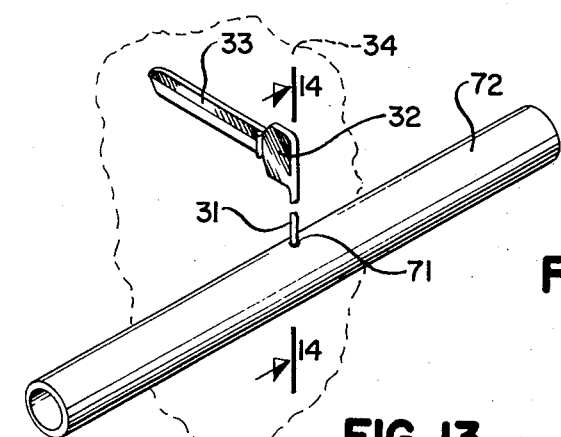
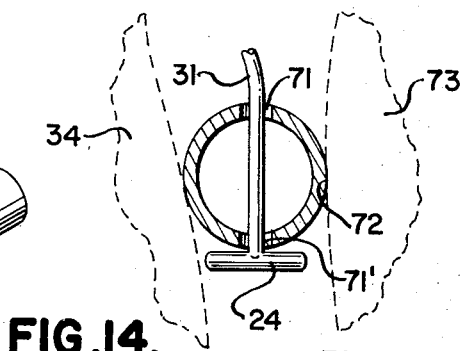
FIG. 13   FIG. 14.
INVENTOR.
BERNARD GLASSBERG
BY
Polachek & Saulsbury
ATTORNEYS

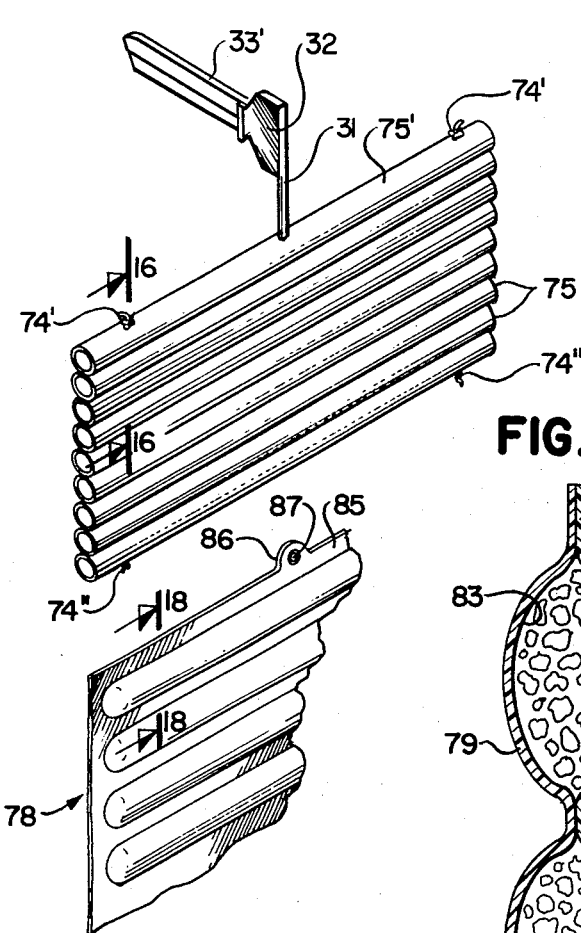
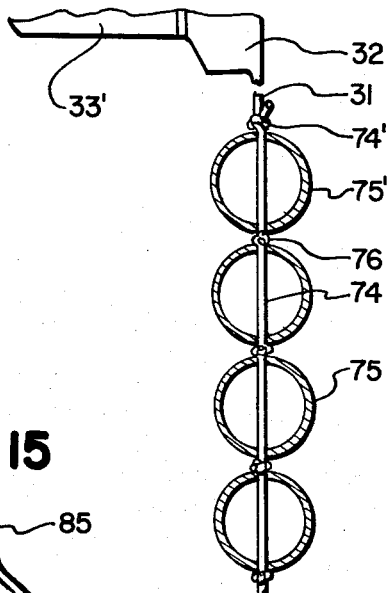
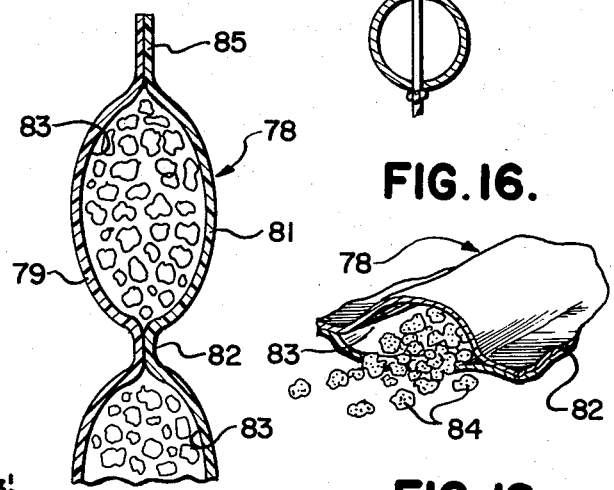
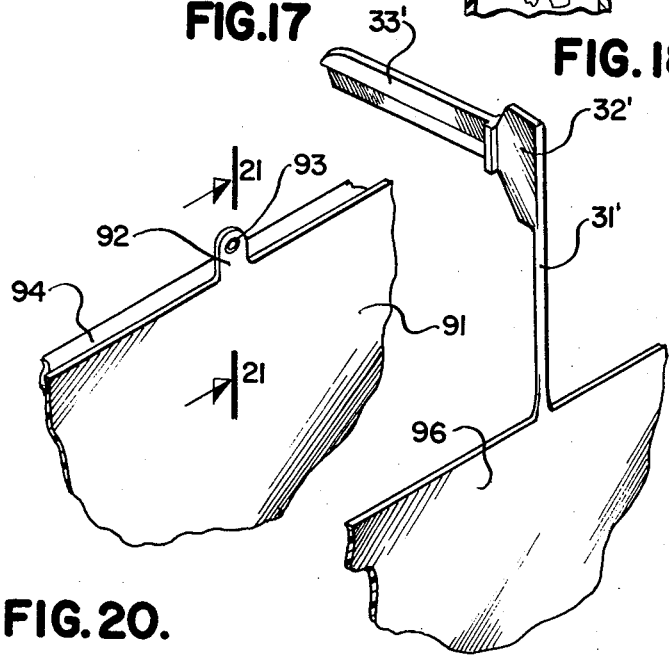
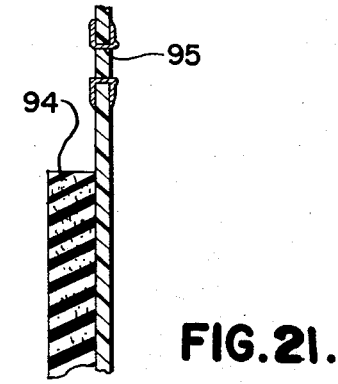

ARTICULATED DOOR PROTECTOR

This invention relates to a car or automobile door protector.

It is an object of the present invention to provide a car door protector which can be attached to a part of a door such as a handle by a hook like part or formation extended upwardly from a vertically extending protection member that can be rolled or collapsed in an accordian like manner into a compact package for storage.

It is another object of the invention to provide a car door protector having a hook member in the form of a key adapted to be inserted into a keyhole in the car door and and having a string depending from the same to which the protection member is attached, either by extending a tongue portion on the end of the string through a hole in the top part of the protection member or formed integrally with the string upon the protection member.

It is still a further form of the invention to provide a protection member formed of slats from plastic sheets joined together by an intermediate foam rubber sheet and the slats provided by alternately cutting parallel across opposite sheets to provide hinge connections between the slats formed thereby, said hinge members permitting the collapse of the protection member.

It is a further object of the invention to provide a car door protector formed of an elongated tube or several tubes that can be assembled together by knotted strings and with a hook member connected to the uppermost tube or single tube for connection of the car door protector to the car door.

Other objects of the invention are to provide a car door protector, having the above objects in mind, which is of simple construction, made of plastic sheet material adapted to cushion and blow from another car door to protect the car door from becoming scratched, dented or damaged to the opening of a door of an adjacent automobile, durable, of pleasing appearance, adapted for use with advertising material, consumes little space, efficient and effective in use.

For a better understanding of the invention, reference may be had to the detailed description taken in connection with the accompanying drawing, in which:

FIG. 1 is a perspective view of an automobile and of the door protector constructed according to one form of the invention applied to the door by a flexible hook adapted to be fitted into the door keyhole.

FIG. 2 is an enlarged view of the flexible key and its depending molded string and tongue.

FIG. 3 is an enlarged view of the door protector and with the flexible key in place in the keyhole and serving to support the door protector by its tongue.

FIG. 4 is an enlarged perspective view of a slide holder adapted to tight fit between the window glass and a door frame and having a depending string and tongue for supporting the door protector.

FIG. 5 is a perspective view of the slide in type hook holder with a corrugated board formed of foldable slats and suspended from the string and tongue extension of the hook.

FIG. 6 is an elevational view of a still further form of the invention in which the upper corrugated board has a hook formation upon the same adapted to be extended over the handle of the door, the door protector being made of foldable slats and having a inwardly struck member for locking the protector further against displacement by a struck portion extended when tight fitted between the door and its frame.

FIG. 7 is a thin elevational view of the form of the invention shown in FIG. 6.

FIG. 8 is an enlarged sectional view illustrating the manner in which the foldable slats are hingedly connected to one another the view being taken on line 8—8 of FIG. 6.

FIG. 9 is an elevational view of the door protector with its parts folding upon itself for the purpose of being transported consuming little space.

FIG. 10 is an enlarged fragmentary sectional view showing in section the slats folded with one another in an accordian like manner and as viewed on line 10—10 of FIG. 9.

FIG. 11 is a front elevational view of a door protector constructed from paper sheets spaced apart by foam rubber, the paper sheets alternately serving as hinged connections between the slats, the uppermost slat having a hole into which the string and tongue of a holder can be passed to support the door protector over the door.

FIG. 12 is an enlarged sectional view as taken online 12—12 of FIG. 11, showing one of the hinge connections and the string and tongue extended through the hole of the uppermost slat.

FIG. 13 is a door guard with a perspective view of a door protector consisting of a single tube with the key hook having its string and tongue extended through holes intermediate the length of the tube.

FIG. 14 is a fragmentary enlarged sectional view illustrating the manner in which the single tube will protect the door from an open car door, the view being taken on line 14—14 of FIG. 13 at the vertical opening in the tube and of the string and T-shaped tongue serving to support the tube.

FIG. 15 is a perspective view of a still further form of the invention comprising a series of plastic or paper tubes held together in a chain like manner with the upper tube being connected by a string and tongue to a key shaped hook to support the tubes from the key opening.

FIG. 16 is an enlarged vertical sectional view of a chain of tubes as viewed on the interconnecting string for the several tubes and looking in elevation upon the key through the tubes suspended therefrom.

FIG. 17 is a fragmentary perspective view of a still further form of the invention comprising a door protector formed of heat sealed layers filled with foam rubber stuffing and providing a series of enlargements and the plastic sheets heat sealed together in parallel areas and with an opening at the top adapted to receive the string and tongue of a key like hook.

FIG. 18 is an enlarged vertical sectional view taken on line 18—18 of FIG. 17.

FIG. 19 is a fragmentary perspective view of the foam rubber space open up to expose the foam rubber particles.

FIG. 20 is a fragmentary perspective view of a still further form of the invention comprising a plastic sheet and with a foam rubber sheet adhered to one side of the plastic sheet, the protector having an upwardly extending projection with a hole through the same for receiving the tongue and string of the key like hook member.

FIG. 21 is a fragmentary sectional view taken on line 21—21 of FIG. 20.

FIG. 22 is a fragmentary perspective view of a still further form of the invention similar to FIG. 20 wherein the plastic sheet has the key and string made integral upon the same, the plastic key being adapted to fit the keyhole in the door and with an integral string the single plastic sheet can be suspended from the integral string of the key like hook.

Referring now particularly to the form of the invention shown in FIGS. 1, 2 and 3, 25 represents generally a door protector that is formed of corrugated paper board which is scored along parallel lines as indicated at 26 to provide slat like portion 27 intermediate the scored parallel fold lines 26. There may be any number of these folds depending upon the height of the door and the area of the door that is desired to be covered for the best protection of the door. The uppermost slat as indicated at 27' has a hole 28 intermediate its length through which a T-shaped tongue 29 and an integral string 31 connected to a key like handle 32 of a key like member or hook 33 which can be extended into the keyhole of the door so as to serve as a support for the door protector 25. When the door protector is not in use it can be folded along its fold lines to consume little space and the key like hook 33 may be kept attached in the hole 28 or can be removed therefrom, in either case little space being consumed by the hook or even the folded slats of the door protector. It should be apparent that the key like hook can be easily and readily inserted into the keyhole of the door.

It should also be apparent that the door protector can be of any desired length and height and that it can cover a portion of the door 34 and likewise a portion 35 of the car body. The door has the usual key hole opening 36 and the key like hook 33 is readily extendable into the same and with this key like hook being made of a plastic material that is strong in tension, the string 31 would be strong and would adequately support the door protector. With the corrugated board being provided with folds these folds may be such when the protector is fully extended downwardly to provide rib like formations along the door protector giving to the door protector more of a ribbed appearance and adding rigidity to the door protector. The corrugations of the corrugated board from which this door protector is made preferably extend vertically as best seen in FIG. 2 at 37 and the scorings or folds 26 are made across the corrugations of the board slats.

In FIGS. 4 and 5 there is shown a slightly different form of the invention and where instead of placing the hook like member into a key opening the hook like member as indicated at 38 in an angled section and a depending attaching portion or hook formation 39 can extend downwardly as best seen in FIG. 5 between a door window glass 41 and door frame 42 so that a string integrally formed on a hook member 38 as indicated at 43 extends downwardly and is preferably of sufficient length to extend downwardly to the bottom most slat of a door protector such as shown in FIG. 3 and indicated here at 44 with scorings 45 and having an uppermost slat 44' with a hole 46 therein through which string 43 can extend and this same string will be preferably sufficiently long to extend downwardly to the bottom slat and its T-shaped tongue 47 extended through a hole 48 in the bottommost slat 44". In this manner the corrugated board slats 44, 44' and 44" can be held to have greater angle and edge relationships with the surface and more accordian like in formation, thereby giving greater strength and rigidity to the corrugated board protector and allow it to be helpful in protecting the more severe bumps that could be received from a car door of an adjacent automobile in the parking lot.

Referring now particularly to FIGS. 6, 7 and 8, there is shown a different form of construction wherein a door protector 51 is made of slats 52 formed of two plastic sheets 53 and 54 and separated by a foam rubber sheet 55. The plastic sheets 53, 54 are alternately cut as indicated at 56 and 57 so as to provide hinge joints between the respective slats 52. The door protector 51 can be collapsed in an accordian like manner as shown in FIGS. 9 and 10. An uppermost slat 52' has its plastic sheets 53 and 54 formed with a hook formation 58 by which the door protector 51 can be suspended from a handle 59 in the door 61. The door protector is provided with a struck formation 62 which can enter into the door opening as the door is closed in order that this door protector can be gripped and held against pivoting displacement upon the handle 59 and to keep the wind from displacing the same.

As shown in FIG. 10, the slats 52 can be folded upon its plastic sheets 53 and 54 at 56 and 57 so that the slats can be assembled into a compact package. The struck member will leave and opening 63 that is negligible and will not uncover any extensive area for which the door protector is needed.

In FIGS. 11 and 12, the slats are constructed as shown in FIGS. 7 and 8 by an assemblage of outer plastic or paper sheets 64 and 65 held together in spaced relationship by foam rubber sheet material 66. The opposite plastic sheets are alternately cut to provide their folds 67 and 68 so that the slats 69 formed in this manner can be collapsed upon one another of these slats 69 as generally shown in FIG. 10. An uppermost slat 69 has a hole 69' therein through which a string of one of the hook devices as shown in FIGS. 2 and 4 can be used to suspend the door protector of FIGS. 11 and 12 from the handle of the door or from the top edge of the window frame in the door. This string 31 has a T-shaped tongue 20 that can be readily extended through the hole 69' of the top slat 69.

In FIGS. 13 and 14, the key like hook member adapted to be extended into the key hole of a door of the vehicle. This is the type of hook shown in this Figure and the string 31 is extended through a hole 71 of a round rigid or semi rigid tube 72 that will extend longitudinally on the car and door surface to thereby protect the same from the adjacent car door as it is opened. This tube 72, preferably made of plastic, but may be made of paper cardboard or the like. The hole 71 extends downwardly through the bottom of the tube as shown at 71'. The car door 73 of the adjacent car, it will be noted, as shown in FIG. 14, will strike the tube 72 at its edge, without engaging with the surface of the car door 34 from which the solitary tube 72 extends.

In FIGS. 15 and 16 there is shown an assemblage of several tubes that are connected together by strings or length material 74. The string 74 extending through the tubes is knotted at the top and bottom ends 74' and 74" respectively. To keep the tubes separated or in a spaced relation from one another, a knot 76 may be tied therebetween. A spacer could also be used, instead of a knot 76 to keep the tubes 75 separated. The string 31 of the keylike member 33 that depends from its knob extends through the upper tube 75' in the same manner that it does in the form of the invention shown in FIGS. 13 and 14. All of the tubes 75 below the uppermost tube 75' are thus supported by the strings 74 from the upper tube 75'. It should be understood that the key hook 33' is made of plastic and its string is of such plastic that it is strong in tension and can hold the weight of the assembled tubes 75 that form the door protector.

In FIGS. 17, 18 and 19, a door protector 78 is made from two sheets of plastic material 79 and 81 that are heat sealed at intervals 82 to provide enclosures 83 parallel with one another and containing a gas, liquid, or solid matter (as shown), foam rubber particles 84, or the combination thereof. This door protector 78 is heat sealed along its periphery edge at 85 and has intermediate its length an upstanding projection 86 with a hole 87 therethrough for receiving the T-shaped tongue 29 of a T-shaped hook member 33 adapted to be extending into the keyhole of a door. It can be seen that upon engagement upon the door of another car that such bump will be cushioned and the surface of the car on which the door protector 78 is suspended will not be marred or dented.

In FIGS. 20 and 21 a simple form of protector is provided and made of but a single plastic sheet 91 with an upstanding projection 92 having a hole 93 therein for receiving the T-shaped tongue 29 or 47 of the hook members 33 or 38 of FIGS. 2 and 4. The sheet 41 has adhered to one face thereof, a foam rubber sheet 94 that will serve to give the cushioning effect needed to prevent the damaging of the door surface. A grommet 95 is provided in the hole 93 so as to protect the projection 92 from being ripped under its weight upon the hook string that attaches the protector door surface.

A still further simple form of the invention is shown in FIG. 22, in which the key shaped hook 33' having a handle 32' and a depending string 31' is integrally formed on a plastic sheet 96. This plastic sheet 96 can have a foam rubber sheet such as shown at 94 in FIGS. 20 and 21 and thereby provide a cushioned car door surface protector made in substantially one piece, including its key shaped hooked member. This door protector can be made by a single stamping operation and provided with a hook and the hook can be formed of any shape such as an ordinary hook 58 of FIG. 6 that can be stamped in the same plain that the sheet is stamped. The plastic material should be formed of a plastic having a high tensile strength.

It should be apparent in all of the forms of the invention above described that this door protector can be rolled up or collapsed up in an accordian like manner so that it will consume little space when transported in the vehicle, but when unrolled or expanded it will over a considerable area of the door and car surfaces.

These door protectors are preferably made of plastic, but can also be made of paper as set forth in the earlier forms of the invention so as to provide an inexpensive door protector, and one that can be extended as it is hooked to the door. It should be apparent with the collapsible slat forms of the invention that the protector can be held against the door surface in such a manner as to provide a rigid resistance in the form of ribs extending parallel to one another and adapted to better absorb a large blow from another car door as well as have the cushioning action afforded by the corrugations and foam rubber centers of the protectors.

While various changes may be made in the detailed construction, it shall be understood that such changes shall be within the spirit and scope of the present invention as defined by the appended claims.

What is claimed is:

1. A car door protector comprising an elongated removable protecting bumper and a hook member extending upwardly from the elongated member intermediate its length by which the protecting bumper can be suspended upon the hook member being attached to a part of the door so as to be suspended downwardly therefrom and over the door and car surface; said door bumper comprising parallel slats hingedly connected to one another to form an articulated connection therebetween and collapsible in stack formation one over the other for the purpose of being stored.

2. A car door protector, as defined in claim 1 and said hook member being of key shape and adapted to fit the key hole of the door and having a depending string with a T-shaped tongue, said protector member having a hole in the top opening thereof for receiving the string and the tongue.

3. A car door protector, as defined in claim 1 and said hook member having a depending apron portion extendable downwardly between the glass and the door frame of a vehicle door and having a depending string with a T-shaped tongue and said protecting member having a hole in the upper part thereof receiving the string and tongue of the hook member.

4. A car door protector, as defined in claim 1 and said hook member being formed integral with the uppermost slat of the door protecting member and collapsible therewith.

5. A car door protector, as defined in claim 1 and said hook member having a depending string and said uppermost and lowermost slats having intermediate openings thereof for receiving the string of the hook member, said string having a T-shaped tongue serving to enter the opening of the lowermost slat.

6. A car door protector, as defined in claim 1 and said hook member being in integral formation upon the uppermost slat, and a portion of said protection member being inwardly struck and adapted to be fitted between the side of the door and its opening to restrain the protection member against outward displacement from the door and car surfaces, said protection member being collapsible along the hinge connections of the slats and said hook member being collapsible with the uppermost slat whereby to consume little storage space when collapsed.

7. A car door protector, as defined in claim 1 and said removable protecting bumper comprising plastic layers held in spaced relationship by a central filled layer, said outer plastic layers being alternately cut to provide parallel extending slots, the uncut layer serving as hinge connections between the slats whereby said protecting member may be collapsed one upon the other to consume little storage space when the car protector is not being used, said hook member being detachably coupled to the uppermost slat.

8. A car door protector, as defined in claim 1 and said each of the slats of the removable protecting bumper comprising plastic layer sheets heat sealed together along parallel lines and having the spaces between the heat sealed portions being filled, the periphery of such protection member being heat sealed to close the ends of the spaces between the heat sealed areas and the upper edge having an opening therethrough and said hook member being detachably connected to said opening.

9. A car door protector, as defined in claim 1 and said each of the slats of the removable protecting bumper comprising a plastic sheet having an upwardly extending projection with an opening therein and a foam rubber layer adhered to one side of said plastic sheet, said hook member being detachably connected through the opening of the upwardly extending projection of the plastic sheet.

10. A car door protector, as defined in claim 1 and said each of the slats of the removable protecting bumper comprising a plastic sheet and said hook member comprising a key shaped formation adapted to be extended into the keyhole of the car door and a string depending from the keyhole member and integrally united with the upper edge of the plastic sheet, said key shaped member, the string and the plastic sheet being struck from plastic sheet material as a unit.

11. A car door protector, as defined in claim 1 and said hook member having a depending string with a tongue formation on the lower end of the same and said protection member comprising a tube having a central opening therethrough through which the tongue and string is extended to support the tube over the car door surface and in a longitudinally extending manner.

12. A car door protector, as defined in claim 11 and knotted strings extended through the opposite ends of the tubes and other tubes assembled upon said strings below the first tube to provide the protection member.

* * * * *